US 6,659,149 B2

(12) United States Patent
Pereira et al.

(10) Patent No.: US 6,659,149 B2
(45) Date of Patent: Dec. 9, 2003

(54) MULTIZONE BEAD FOR A TIRE HAVING EXTENDED MOBILITY (75) Inventors: Pedro Costa Pereira, Clemont-Ferrand (FR); Bernard Guerinon, Clemont-Ferrand (FR)

(73) Assignee: Michelin Recherche et Technique, Granges-Paccot (CH)

( * ) Notice: Subject to any disclaimer, the term of this patent is extended or adjusted under 35 U.S.C. 154(b) by 0 days.

(21) Appl. No.: 10/161,302

(22) Filed: Jun. 3, 2002

(65) Prior Publication Data
US 2002/0179216 A1 Dec. 5, 2002

Related U.S. Application Data (63) Continuation of application No. PCT/EP00/12061, filed on Nov. 30, 2000.

(30) Foreign Application Priority Data

Dec. 3, 1999 (FR) .............................................. 99 15367

(51) Int. Cl.⁷ .......................... B60C 15/00; B60C 15/02; B60C 15/024
(52) U.S. Cl. ....................... 152/544; 152/539; 152/547; 152/550
(58) Field of Search ................................ 152/544, 539, 152/547, 550, 543, 516, 158, 520

(56) References Cited

U.S. PATENT DOCUMENTS

| | | |
|---|---|---|
| 4,895,692 A | 1/1990 | Laurent et al. |
| 5,616,209 A | 4/1997 | Laurent et al. |
| 5,634,993 A | 6/1997 | Drieux et al. |
| 5,660,656 A | 8/1997 | Herbelleauu et al. |
| 5,971,047 A | 10/1999 | Drieux et al. |
| 6,179,028 B1 | 1/2001 | Drieux et al. |
| 6,179,029 B1 | 1/2001 | Costa Pereira et al. |

FOREIGN PATENT DOCUMENTS

| | | |
|---|---|---|
| EP | 0582196 | 2/1994 |
| EP | 0869017 | 10/1998 |
| EP | 0922592 | 6/1999 |
| GB | 2061199 | 5/1981 |
| WO | 9964225 | 12/1999 |

Primary Examiner—Adrienne C. Johnstone
(74) Attorney, Agent, or Firm—Baker Botts L.L.P.

(57) ABSTRACT

A tire for a vehicle wheel, comprising two sidewalls, a crown zone provided on its radially outer portion with a circumferential tread, and a bead arranged in the radially inner portion of each of the sidewalls. Each bead comprises a seat and an outer flange which are intended to come into contact with the rim, the seat having a generatrix, the axially inner end of which lies on a circle of diameter greater than the diameter of the circle on which the axially outer end is located. A carcass-type reinforcement structure extends substantially radially from each of the beads, along the sidewalls, towards the crown zone. Each bead includes a zone for anchoring the carcass-type reinforcement structure in the bead, a bearing zone for the bead against a suitable rim seat, and an intermediate zone, which is provided substantially between said anchoring zone and the bearing zone.

14 Claims, 8 Drawing Sheets

MULTIZONE BEAD FOR A TIRE HAVING EXTENDED MOBILITY

CROSS REFERENCE TO RELATED APPLICATIONS

This is a continuation of international application PCT/EP00/12061 filed Nov. 30, 2000, which was published in French on Jun. 7, 2001 as international publication WO 01/40000 A1.

BACKGROUND OF THE INVENTION

1. Technical Field of the Invention

The present invention relates to a tire for a vehicle wheel in which at least one of the beads comprises a seat having a generatrix, the axially inner end of which lies on a circle of a diameter greater than the diameter of the circle on which the axially outer end is located. This type of design is particularly suited to the new generations of tires which can be used, within certain limits, in conditions of low pressure, or even zero or virtually zero pressure, with the risk of separation of the tire from the rim on which it is mounted being eliminated. This concept is frequently designated by the expression "extended mobility".

2. The Related Art

For a long time, tire manufacturers have been trying to develop a tire which does not create any source of potential risk or danger in the event of an abnormal drop in, or even total loss of, inflation pressure. One of the difficulties encountered relates to travelling with a flat tire or at very low pressure. In fact, when travelling at very low pressure, or even at zero pressure, with conventional tires, the beads are at great risk of separating from the periphery of the rim against which they are held by the inflation pressure.

Numerous solutions have been tested in order to overcome these disadvantages. Frequently, these solutions cause additional difficulties in mounting/demounting the tire on/from the rim.

EP 0 582 196 (U.S. Pat. No. 5,660,656) discloses a tire comprising a tread extended by two sidewalls and two beads and also a carcass anchored in the two beads to an annular reinforcement. The carcass is formed of cords in an adjacent arrangement, which are aligned circumferentially and are in contact with at least one layer of bonding rubber of very high elasticity modulus in the hooking zone of the bead comprising the annular reinforcement. In this tire, the annular reinforcement of the hooking zone of the bead is formed of stacks of circumferential cords with the interposition of a layer of bonding rubber of very high elasticity modulus between the reinforcement cords of the carcass and the stacks of circumferential cords.

This embodiment is intended for tires of conventional type, with the beads being held against the rim hook due to the inflation pressure of the tire. In this type of arrangement, there is a predominance of stresses of the lateral or axial type, which induces major compressive forces that act substantially axially from the sidewalls towards the center of the bead. These forces increase according to the inflation pressure. The increase in pressure tends to make the bead slide against the hook, radially towards the outside. The stresses induced radially towards the inside, against the seat of the rim, decrease with an increase in pressure, or with any increase in the tension of the carcass-type reinforcement structure.

It will furthermore be noted that the stacks of cords are aligned in a direction substantially parallel to the orientation of the profile of the rim hook against which the bead bears.

The profile of the bead of this type of tire is relatively narrow and elongated; the anchoring is distributed over the major part of the height and width of the bead. The passage of the carcass into the bead is generally substantially central relative to the walls of the bead.

Furthermore, when a relatively narrow bead is subjected to predominantly axial stresses, neither the inflation pressure nor the tension induced in the carcass permits the generation of large moments or torques, which tend to make the bead pivot or turn on itself.

With such a type of tire, if the pressure drops and the vehicle continues to travel, the holding of the tire on the rim is no longer ensured, and in the majority of cases it rolls off the rim.

EP 0 673 324 (U.S. Pat. No. 5,634,993) describes a rolling assembly comprising at least one tire with a radial carcass reinforcement which is anchored within each bead and a rim of specific shaping. This rim comprises a first seat, with a generatrix such that the axially outer end of the generatrix is spaced from the axis of rotation by a length less than the spacing between its axially inner end and the axis of rotation, and is defined axially to the outside by a protrusion or rim flange. The tire comprises bead seats suitable for mounting on the rim. The type of tire/rim interface proposed in this document has many advantages compared with the solutions already known, in particular with regard to the ease of mounting/demounting, while making it possible to travel a certain distance despite a drop in pressure.

The present invention is directed in particular at proposing certain types of architecture in order to optimize the qualities of the assembly proposed in the document referred to above.

EP 0 748 287 (U.S. Pat. No. 6,179,028) describes a solution which permits initial optimization of the basic technology described in EP 0 673 324 referred to above. This is a tire, at least one bead of which has a structure that makes it possible to modify the clamping of the bead according to the tension of the carcass reinforcement and, in particular, reinforcement thereof when the inflation pressure increases to its rated value. The document thus proposes using a bead with anchoring of the end of the carcass by turning it up about the base of the bead wire, via the axially and radially inner sides relative to the bead wire. The bead also comprises, adjacent to the bead wire and axially to the outside thereof, a profiled element of rubber mix of relatively high hardness against which the bead wire can exert a compressive force when the tension of the carcass reinforcement increases. This compressive force creates self-clamping of the toe of the bead on the mounting rim. The tension of the carcass therefore involves displacement of the bead wire towards the outside, so that the latter generates the compressive force. In such a configuration, the presence of a bead wire of conventional type and the turning-up of the carcass beneath the latter are presented as being indispensable for generating the compressive force. This restricts the other types of arrangement which can be considered Moreover, EP 0 922 592 describes two embodiments with the carcass anchored by turning it up axially towards the outside. The first embodiment proposes anchoring of the carcass in the bead by turning it up radially towards the outside of the end of the carcass. The upturn is surrounded on either side by two radially superposed layers of metal wires arranged axially side by side and covering substantially all of the axial portion along the seat of the bead. The layers are arranged so as to be parallel to the seat. The types of cords and the corresponding dimensions are very precise.

The second solution proposed in this document relates to bead seats with different diameters. The securing of the carcass is also effected differently from the first solution. First of all, the carcass is subdivided into two portions which are radially separated at the level of the bead. Each portion is adjoined by a layer of cords which is arranged radially, each layer being arranged radially to the outside against each of the carcass portions. The radially outer carcass portion and the layer of cords radially to the inside are separated by an insert of the type of elastomer of high hardness provided in the bead. This insert axially lines the central portion of the bead and rises radially towards the outside and axially towards the inside, beyond the radial limit of the presence of the metal wires.

The two examples of solutions of EP 0 922 592 have several disadvantages. Thus, the securing of the carcass proposed in this document requires the presence of an upturn axially towards the outside of the end portion of the carcass. Furthermore, the superposed layers of cords are arranged radially close to the seat of the bead, for a good part at a radial position closer to the axis of rotation than the upper portion of the flange on which the bead bears. Unless highly extensible cords are used, it is difficult to mount/demount the tire, due to the unfavourable radial position of the cords. It will also be noted that the stacks are oriented substantially parallel to the profile of the seat against which the bead bears.

According to the second solution, the carcass is subdivided into two portions and an insert of high hardness is necessary to separate, on the one hand, the layers of cords and, on the other hand, the two carcass portions. However, the carcass is not anchored in the insert. The form of the insert described is limitative.

SUMMARY OF THE INVENTION

It is an object of the present invention to overcome the various disadvantages inherent in the solutions set forth above.

To do this, it provides a tire for a vehicle wheel, comprising:

two sidewalls spaced apart axially from each other, joined at their radially outer portions by a crown zone provided on its radially outer portion with a circumferential tread;

a bead, arranged radially to the inside of each of the sidewalls, each bead comprising a seat and an outer flange which are intended to come into contact with a suitable rim;

a reinforcement structure extending substantially radially from each of the beads, along the sidewalls, towards the crown zone;

at least one of the beads comprising:

a bead seat comprising a generatrix, the axially inner end of which lies on a circle of a diameter greater than the diameter of the circle on which the axially outer end is located;

an anchoring zone for the reinforcement structure in the bead, comprising a substantially radial arrangement of circumferential cords, the anchoring zone being arranged in the substantially radially inner portion of the bead;

an intermediate zone, arranged substantially axially externally to the anchoring zone and comprising at least one portion which is radially external relative to the radially innermost portion of the anchoring zone;

a bearing zone for the bead which is able to lie directly or indirectly against the suitable rim seat, and extending substantially axially along the bead seat and comprising at least one portion arranged substantially radially internally to the intermediate zone; and the intermediate zone comprising a structure which permits the transfer of forces from the anchoring zone to the bearing zone of the bead so as to increase the bearing force of the seat of the bead in its axially outer portion when a substantially radially external tensile force is exerted on the reinforcement structure at least at the level of the bead.

Such a configuration permits optimum holding of the bead on the rim, in particular at the level of the rim seat/bead seat interface. The forces acting on the anchoring zone are then transmitted effectively to the zone of the seat of the bead. The radial continuity makes it possible to minimize the impact of the shearing forces acting against the bead in its entirety.

The anchoring zone does not comprise a bead wire, in particular a bead wire of conventional type, such as, for example, a multi-cord bead wire against which a carcass ply is turned up, this bearing or contact or cooperation effecting the holding of the carcass.

Each of the zones taken in isolation, and also all the zones together, to some extent forms an internal bead capable of effecting relative movements, such as, for example, of the angular or rotational type, relative to another zone, or relative to a virtual center of pressure CP, or relative to the seat of the rim, etc.

Advantageously, the intermediate zone ensures a mechanical connection between the anchoring zone and the bearing zone. The intermediate zone ensures continuity between the other two zones, such that the mechanical forces are transmitted from the anchoring zone towards the bearing zone.

The intermediate zone is able to exert a force substantially radially towards the inside against the axially outer portion of the bearing zone.

The arrangement of circumferential cords contributes to the circumferential clamping force of the tire against the rim on which it is mounted. The level of clamping is determined so as to ensure a good compromise between the ease of mounting/demounting and the assurance of reliable, durable mounting.

The intermediate zone ensures a mechanical connection between the anchoring zone and the bearing zone. The anchoring zone and the intermediate zone may be twinned mechanically. The same applies to the intermediate zone, which may be joined to the bearing zone. However, the anchoring zone is preferably not directly joined to the bearing zone.

The reinforcement structure of the sidewalls and the crown is advantageously of the carcass type, its mechanical properties being similar to those of carcass plies of known type. Furthermore, this reinforcement structure is advantageously formed without axial separation at the level of the bead. Thus all of the cords of the circumferential arrangement preferably occupy a substantially identical axial position.

Preferably, the anchoring zone is radially external to the bearing zone.

The transfer of forces advantageously takes place by a moment of force.

The anchoring zone of the reinforcement structure in the bead is advantageously formed at least in part of a rubber mix of substantially high modulus. This modulus may for example be substantially equal to or greater than 20 MPa, and preferably greater than 40 MPa. The presence of this type of rubber mix contributes to the anchoring of the carcass-type reinforcement structure. The reinforcement structure is at least partially in contact with this mix, or even preferably at least partially embedded in the mix.

Preferably, the bearing zone is substantially elongated. It is extended, for example, substantially along the seat of the bead. The transfer of forces upon rotation of the bottom zone of the axially inner portion of the bead towards the axially outer portion of the bead is thus possible, while maintaining bearing pressure against at least a portion of the seat of the bead. The transfer of forces creates self-clamping of the toe of the bead against the rim.

The bearing zone is preferably substantially adjacent to the rim seat.

Preferably, the anchoring zone is arranged in the portion of the bead which is substantially in the immediate vicinity of the carcass-type reinforcement structure. It may therefore be located either on only one or on both sides of the reinforcement structure.

Preferably, the bearing zone is substantially formed of a rubber mix of high modulus. The loading of this zone is thus limited and the contact with the seat of the rim is optimized. The modulus may for example be substantially equal to or greater than 20 MPa, and preferably greater than 40 MPa.

Preferably, the intermediate zone is substantially formed of a rubber mix of high modulus. It may advantageously be surrounded or encircled by one or more cords arranged around the zone, for example at 90°, so as to apply compressive stress to the zone. This modulus may for example be substantially equal to or greater than 20 MPa, and preferably greater than 40 MPa.

According to another advantageous variant, the bead also comprises a loadable buffer zone, which is arranged in the radially inner and axially outer portion and which is capable of bearing against a flange of the rim. The presence of such a buffer zone promotes the rotation of the bottom zone and also makes it possible to secure the axial hooking of the bead against the rim flange. The presence of a zone of rubber of high modulus in a radially inner portion relative to the flange provides good axial holding and prevents the bead from sliding axially towards the outside.

According to another advantageous variant, the bead portions generally around the anchoring, intermediate and bearing zones are generally occupied by a material having an elasticity modulus which is lower than that of the material of the anchoring, intermediate and bearing zones. These various zones, in fact, have a certain relative mobility relative to the rim seat on which the bead is mounted. This mobility is often expressed by displacements of the angular or rotational type. Each of the zones also has a certain relative mobility relative to the adjacent portions of the bead, which are formed of rubber mixes of lower modulus, and/or relative to the other neighbouring zones. This mobility can expressed, for example, by displacements of the angular or rotational type.

Preferably, the elasticity modulus of the rubber mix of high modulus is greater than 20 MPa, and preferably greater than 40 MPa.

According to another advantageous example, the bearing zone and/or the intermediate zone is/are arranged and defined such that upon substantially axially external rotation of the bottom zone of the tire, none of the zones exerts a force against the rim flange or hook which would be liable to cause disassembly of the bead of the tire. Thus, for example, the axially outer limit of the zones corresponds substantially to the outer limit of the rim on which the tire is likely to be mounted.

According to another advantageous variant, the intermediate zone comprises a substantially radial arrangement of circumferential cords. Similarly, the bearing zone may comprise a substantially radial arrangement of circumferential cords.

Advantageously, the number of axially inner cords of the anchoring zone is at most 1.5 times the number of axially outer cords. These are cords which are axially to the inside or the outside relative to the carcass-type reinforcement structure.

Preferably, the bead of the tire comprises a carcass-type reinforcement structure which extends substantially radially from each of the beads, along the sidewalls, towards the crown zone, each bead being reinforced by a substantially radial arrangement of circumferential cords arranged in stacks, a portion of the carcass-type reinforcement structure being arranged in the immediate proximity of at least one portion of a stack, and the space between such portions generally being filled by a rubber mix of high elasticity modulus.

An interface zone is advantageously formed by a portion of the reinforcement structure and at least one stack, such zone being generally embedded in a rubber mix of high modulus. Advantageously, the interface zone generally covers the stacks and the adjacent portion of reinforcement structure. Such an arrangement, in particular at the level of the bead, permits very great flexibility in defining the various zones comprising mixtures of different natures and/or characteristics. The same applies to the cords, which may be formed in a large number of configurations. Taking into account these two aspects, it is possible to optimize the design and manufacture of the tires, according to the type of vehicle for which the tire is intended and the associated constraints of use. It is also possible to provide more appropriate arrangements which facilitate certain types of automated manufacture, for example with assembly on a central core and/or without using semi-finished products. It is thus possible to design a tire for a given vehicle which can be manufactured at lower cost.

The anchoring of the reinforcement structure in the bead is ensured, despite the absence of a bead wire of conventional type around which the carcass is usually turned up to create a reliable anchoring link. This type of structure is also advantageous owing to its compactness, and is easy to mount/demount. Furthermore, the traditional carcass upturn which is found in beads of known types, comprising a seat having a generatrix, the axially inner end of which lies on a circle of a diameter greater than the diameter of the circle on which the axially outer end is located, can be dispensed with without sacrificing the integrity, solidity or endurance of the assembly. This aspect contributes to simplifying manufacture, while offering very great latitude in terms of configurations.

Dispensing with the upturn is made possible by using mixes of high modulus in the interface zone in direct contact with the carcass-type reinforcement structure in the anchoring zone. In the conventional tire, the carcasses are in intimate contact with mixes of low or very low modulus, which involves great lengths for transmitting the forces to the bead wire.

According to a particularly advantageous method of manufacture in which the various constituents of the tire are arranged directly on a central core, the shape of which imparts to the tire during manufacture a substantially similar shape to the shape of the finished product, dispensing with the upturn (which exists with a conventional structure) permits advantageous simplification of manufacture.

Preferably, at least one outer flange of a bead is arranged so as to be extended substantially axially and radially towards the outside from the axially outer end of the seat of the bead. For example, the outer flange, which is axially external to the seat, comprises a substantially rectilinear generatrix inclined radially externally relative to the axis of rotation of the tire by an angle of between 30° and 85°, measured from such axis.

Such a flange is normally used together with a rim comprising a rim flange, commonly referred to as a "side", also arranged so as to be extended substantially axially and radially towards the outside from the axially outer end of the seat of the rim. This flange is capable of serving as a bearing zone when the bead is subjected to a force which tends to push it back radially towards the outside. This may be the case, for example, when the phenomenon of rotation of the bead occurs or, alternatively, under the influence of the stress induced during sharp cornering. The flange contributes to holding the bead, and hence the tire, on the rim properly, in particular avoiding any spilling-over axially towards the outside.

According to an advantageous form of embodiment of the invention, the bases of the stacks (the cords radially closest to the axis of rotation of the tire) are arranged radially farther to the outside than the end of the rim flange (axially and radially outermost portion of the flange). The bases of the stacks are advantageously provided so as to be arranged radially externally relative to the flange of the rim which is matched to the tire. The mounting/demounting operations are then facilitated.

Advantageously, the carcass-type reinforcement structure extends substantially radially from each of the beads, along the sidewalls, towards the crown zone. Such structure may thus be unitary and extend from one bead to the other, or alternatively may be divided into two half-structures, each extending along a single sidewall.

According to an advantageous variant, the substantially radial arrangement of circumferential cords is arranged in at least one stack, with each stack being arranged on the axially outer side relative to the carcass-type structure.

According to another advantageous variant, the substantially radial arrangement of circumferential cords is arranged in at least one stack, with each stack being arranged on the axially inner side relative to the carcass-type structure.

According to another advantageous variant, the substantially radial arrangement of circumferential cords is arranged in at least two stacks, the stacks being arranged on either side relative to the carcass-type structure.

The number of stacks and the number of windings or turns of each of the stacks is advantageously established according to the characteristics desired for the tire, for example its operating pressure. For example, a larger number of stacks may be desired in order to increase the rigidity at the level of the zone of the bead.

The carcass-type structure is preferably formed of a cord winding extending back and forth between the two beads, forming loops in each of the beads. Furthermore, the cord winding is preferably formed of a single cord.

According to an advantageous variant, the carcass-type structure forms an extension towards the axis of rotation of the tire beyond the base of the stacks. In such a case, since the upturn of the carcass-type structure is not indispensable for anchoring purposes, the upturn may be made without duplication with circumferential cords running along the structure, and/or without the upturned portion being entirely or partially arranged in a zone of rubber mix of high modulus.

According to another advantageous variant, the inner bead intended to be arranged on the inner side of the wheel and the outer bead intended to be installed on the outer side of the wheel are arranged asymmetrically. Thus, for example, the number of stacks or the number of turns of each of the stacks may be different. Some examples of asymmetrical arrangements are illustrated in the drawings, in which, for example, the number of stacks of cords in the bead on the inner side is different from the number of stacks of cords in the bead on the outer side. For example, the number of stacks of cords in the bead on the inner side is less than the number of stacks of cords in the bead on the outer side. The reverse is also possible, depending on the desired characteristics.

According to another aspect, the symmetry relates to the arrangements of the anchoring, intermediate and bearing zones. Each of the beads may have different architectures in which, for example, the forms, arrangements and dimensions of one or more of the zones may vary. It is also possible to vary the constituent materials, the mechanical properties, such as, for example, hardness, just as the number of zones can be varied.

BRIEF DESCRIPTION OF THE DRAWINGS

Other characteristics and advantages of the invention will become apparent from the following description of exemplary embodiments of the invention, which are given in non-limitative manner, with reference to the accompanying drawings, in which.

DETAILED DESCRIPTION OF EXEMPLARY EMBODIMENTS

In the present description, the term "cord" very generally designates both monofilaments and multifilaments or assemblies such as cables, plied yarns or, alternatively, any equivalent type of assembly, whatever the material and the treatment of the cords. They may, for example, be surface treatments, coating or pre-sizing in order to promote adhesion to the rubber.

The term "radial structure" is understood to mean an arrangement at 90°, but also, in accordance with custom, at an angle close to 90°.

It is known that, conventionally, the carcass ply or plies is/are turned up about a bead wire. The bead wire then performs a function of anchoring the carcass. In particular, it withstands the tension which develops in the carcass cords, for example under the action of the inflation pressure. The arrangement described in the present application makes it possible to ensure a similar anchoring role. It is also known to use the bead wire of conventional type to ensure a function of clamping the bead on a rim. The arrangement described in the present application also makes it possible to ensure a similar clamping function.

In the present description, "bonding rubber" is understood to mean the rubber mix which may possibly be in contact with the reinforcement cords, adhering to them and able to fill the gaps between adjacent cords.

"Contact" between a cord and a layer of bonding rubber is understood to mean the fact that at least part of the outer circumference of the cord is in intimate contact with the rubber mix constituting the bonding rubber.

"Sidewalls" refers to the portions of the tire, most frequently of low flexural strength, located between the crown and the beads. "Sidewall mix" refers to the rubber mixes located axially to the outside relative to the cords of the reinforcement structure of the carcass and to their bonding rubber. These mixes usually have a low elasticity modulus.

The term "bead" refers to the portion of the tire radially internally adjacent to the sidewall.

Figure 1:
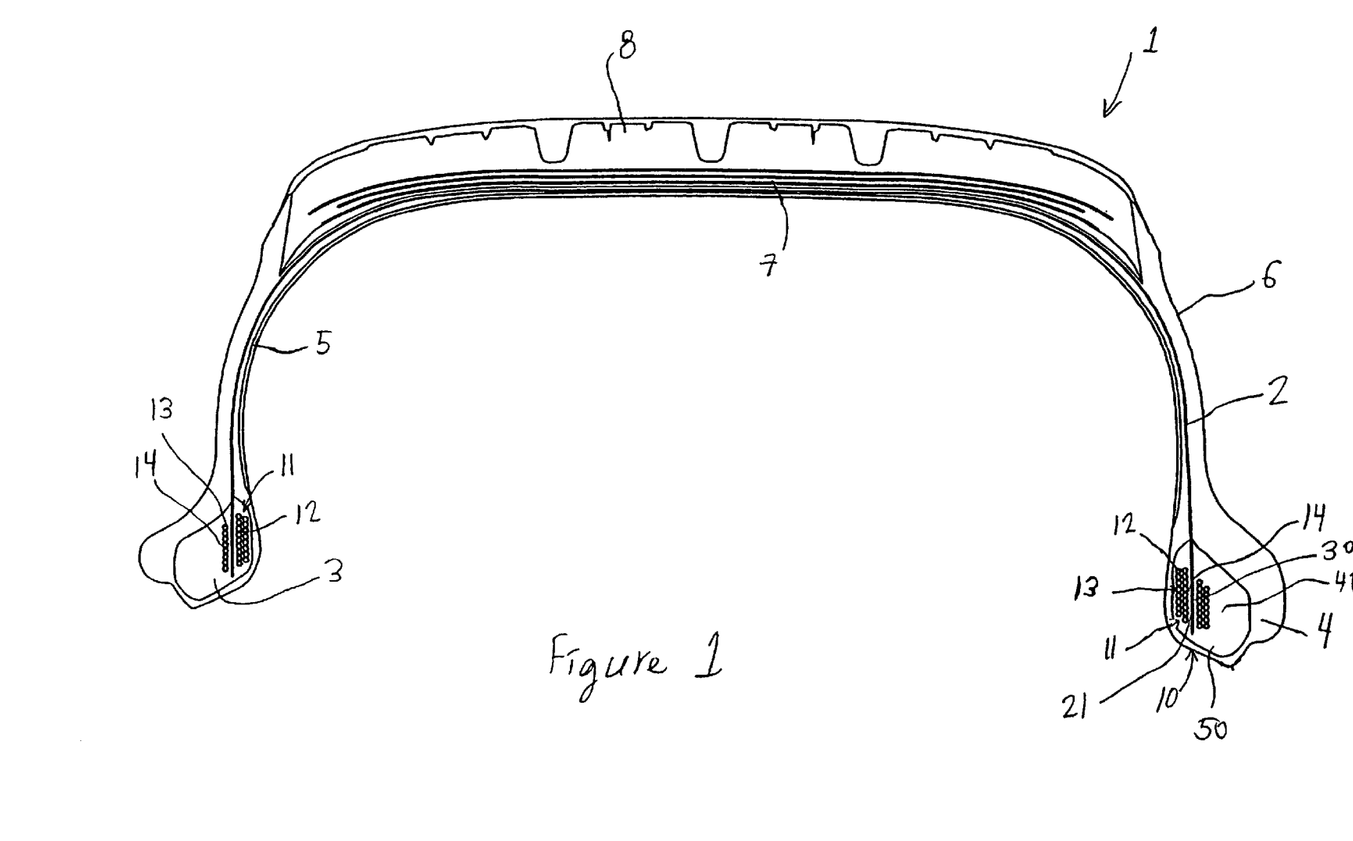
FIG. 1 shows, in cross-section, a tire according to the invention.

FIG. 1 shows, in cross-section, a tire 1 according to the invention. This tire comprises a first sidewall 5 adjacent to a first bead 3 which preferably corresponds to the axially inner bead. Similarly, the opposite portion of the tire comprises a second sidewall 6 adjacent to a second bead 4. A crown 7, on which there is provided a tread 8, provides the join between the sidewalls. The crown preferably comprises at least one reinforcement belt.

The tire comprises a reinforcement structure 2, such as, for example, a carcass, provided with reinforcements which are advantageously shaped in a substantially radial arrangement. The structure 2 may be arranged continuously from one bead to the other, passing via the sidewalls and the crown, or alternatively it may comprise two or more parts, arranged for example along the sidewalls, without covering the entire crown.

The end portions of the reinforcement structure 2 cooperate with the beads. There is thus effected anchoring of these portions in the beads so as to ensure the integrity of the tire.

The reinforcement structure 2 can be formed by winding a single cord which extends back and forth between the two beads, forming loops in each of the beads. These loops, which are coated in the rubber mix of high modulus, contribute to the mechanical bond between the reinforcement structure 2 and the bead, in particular the stacks 13. By the presence of loops between the "back" and "forth" sections of the cord, it can be seen that the reinforcement is of the monofilament type. Of course, the carcass might not be manufactured continuously from a single cord, and there might not be any loops, but rather, for example, cut ends.

Figure 2:
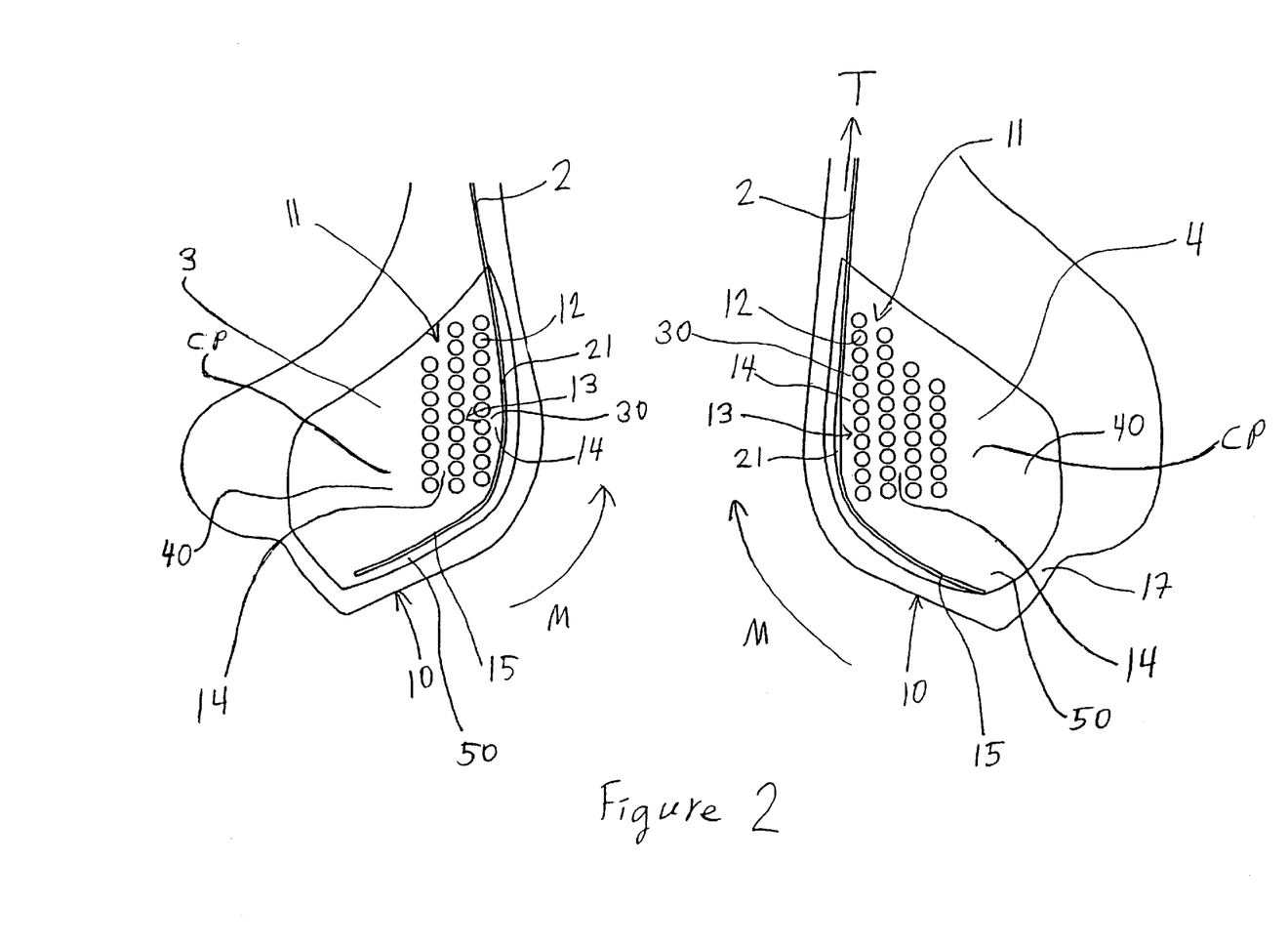
FIG. 2 shows, in an enlarged cross-section, the beads of a first variant of a tire according to the invention, in which the stacks of cords are arranged on the same side of the reinforcement structure, namely, in this example, the axially outer portion, and in which the three zones of the bead are twinned.

As illustrated in FIG. 2, circumferential cords 12, preferably arranged in the form of stacks 13, form an arrangement of cords 11, which is provided in each of the beads 3 and 4. The cords 12 are preferably metal ones. Part or all of the cords 12 may also be made of textile or other materials.

At least one cord 12 of one of the stacks 13 is preferably arranged in the immediate proximity of an end portion 21 of the reinforcement structure 2. The stacks 13 may also be arranged such that an end portion 21 is inserted between stacks 13.

The space between the cords 12 and the reinforcement structure 2 is occupied by a bonding rubber mix 14. It is also possible to provide for the use of a plurality of mixes having different characteristics, defining a plurality of zones, the combinations of mixes and the resultant arrangements being virtually unlimited. However, it is advantageous to provide for the presence of a rubber mix of high elasticity modulus in the zone of intersection between the arrangement of cords 11 and the reinforcement structure 2. By way of non-limitative example, the elasticity modulus of such a rubber may reach or even exceed 40 MPa.

The arrangements of cords 11 may be arranged and manufactured in various ways. For example, a stack 13 may advantageously be formed of a single cord 12, wound (substantially at zero degrees) in a spiral, preferably from the smallest diameter towards the largest diameter. A stack may also be formed of a plurality of concentric cords laid one within another.

The position of the stacks 13 may vary in a virtually infinite number of possible ways. Some non-limitative examples are illustrated and described in the present description. The base of the stacks (radially inner portion) may be substantially co-radial (aligned radially), as illustrated in FIG. 2, or be radially offset, for example such that all of the first cords of each stack form an alignment having a given angle relative to the axis of rotation of the tire.

Surprisingly, it has been noted that anchoring of the reinforcement structure in the bead can be effected by the type of interface described, despite the fact that in the tire of extended mobility according to the invention, the forces induced at the bead differ from those of a bead of conventional type. For example, with the tire according to the invention, an increase in pressure causes an increase in the radial thrust of the seat of the bead against the seat of the rim.

Figure 8A:
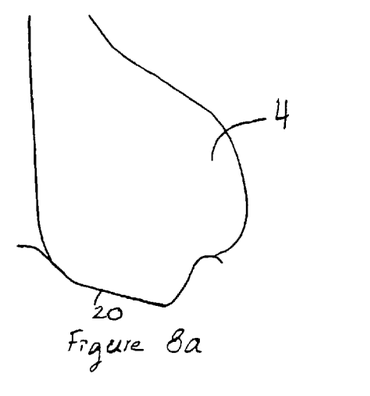
FIGS. 8a to 8e show the evolution of the position of a bead according to the invention on the rim intended for producing the assembly, as a function of the inflation pressure.
Figure 8B:
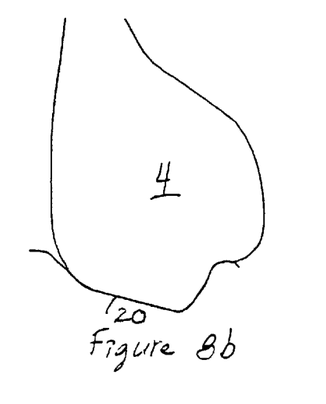

FIGS. 8a to 8e show the evolution of the angular position of the bottom zone of a tire, and in particular of the anchoring zone of a bead relative to its initial geometry when not mounted and not inflated. It will be observed that the more the pressure increases, the more the axially outer portion of the seat bears against the seat 20 of the rim. FIG. 8a illustrates the non-inflated assembly, at zero bar. The positioning angle is then about 10°. FIG. 8b illustrates the assembly inflated to one bar. The positioning angle is then about 8°.

Figure 8C:
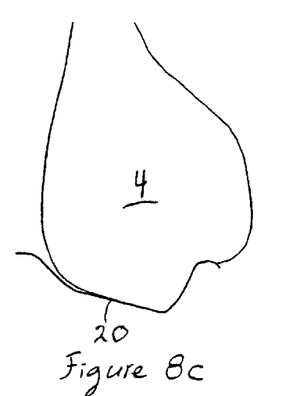
Figure 8D:
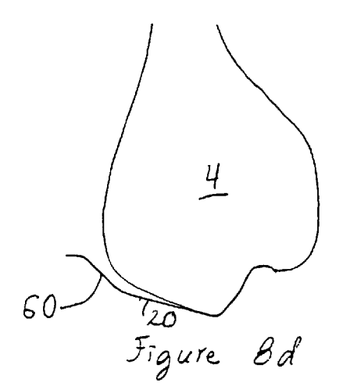
Figure 8E:
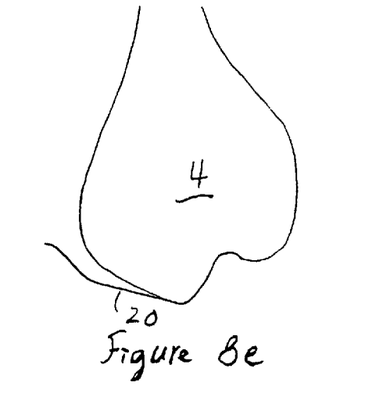

FIG. 8c illustrates the assembly inflated to three bar. The positioning angle is then about 3°. FIG. 8d illustrates the assembly inflated to six bar. The positioning angle is then about −4°. FIG. 8e illustrates the assembly inflated to eight bar. The positioning angle is then about −11°.

Figure 7:
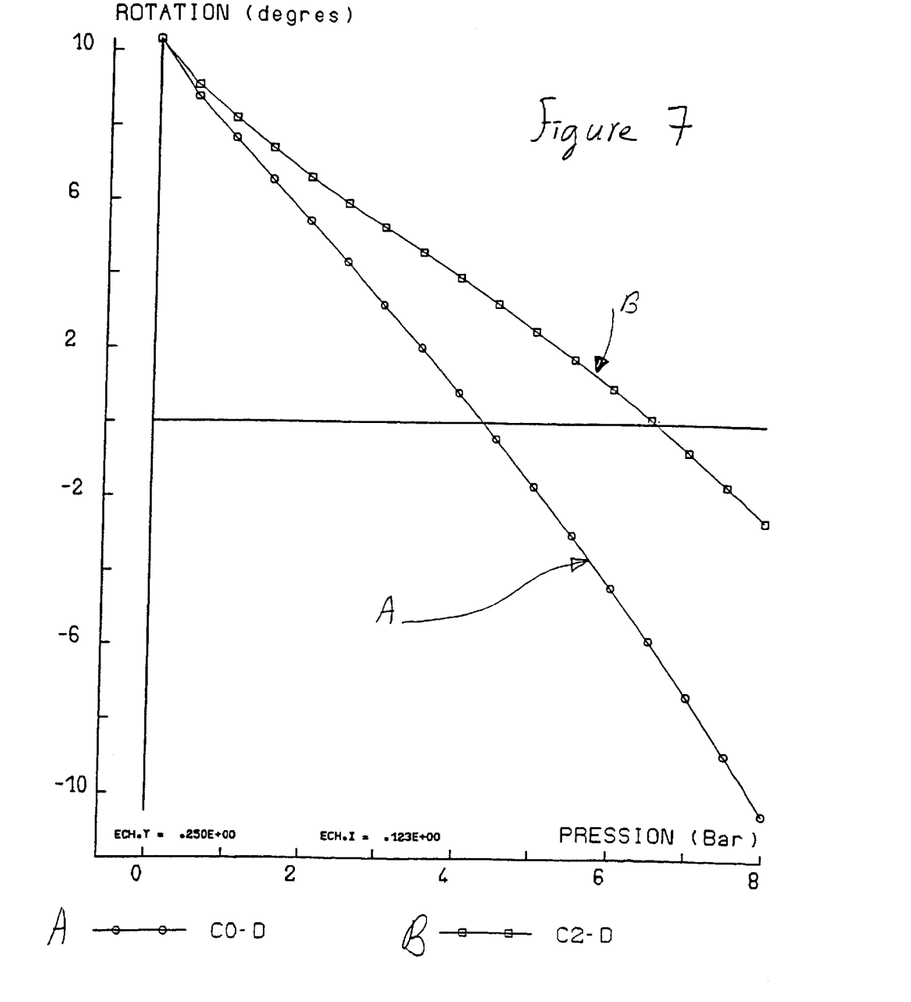
FIG. 7 graphically illustrates two curves which illustrate the rotation of the bottom zone of the tire according to the inflation pressure.

FIG. 7 graphically illustrates two curves which illustrate the rotation of the bottom zone of the tire according to the inflation pressure. The curve A corresponds to an architecture in which the two stacks of cords are arranged axially externally to the carcass-type reinforcement structure 2. The curve B corresponds to an architecture in which two of the stacks of cords are arranged axially internally relative to the carcass-type reinforcement structure 2. Curve A therefore corresponds to an example in which the reinforcement structure 2 is axially farther towards the inside than in the example corresponding to curve B. The lever-arm effect, for example relative to the center of pressure CP, is greater in the first example.

It will furthermore be noted that the results of the rotation of the bottom zone differ in these two examples, such that an architecture in which the reinforcement structure 2 is axially farther towards the inside, and therefore with a larger lever arm, imparts more rotation to the bottom zone of the tire, the other parameters such as the dimensions, constituents, etc., of course being similar in the two examples. Thus curve B of FIG. 7 has lesser rotation than curve A, for the same variation in inflation pressure.

These tests have made it possible to note that it is possible to modulate the level of rotation of the bottom zone of the tire by using various types of architecture in which the relative positions of the cords 12 and/or of the reinforcement structure 2 vary relative to each other or, alternatively, relative to a given point of the bead, such as, for example, the center of pressure CP.

By making a correlation between the graph of FIG. 7 and the various positions shown in FIG. 8, it will be noted that at zero or low pressure the pressure is particularly concentrated on the axially inner portion of the seat; the more the pressure increases within the tire, the more the stresses exerted on this portion axially to the inside of the seat decrease and move towards a zone axially farther to the outside of the bead. From a certain value of the pressure of the tire onwards, the forces exerted in the two zones are equivalent; then the forces exerted in the zone axially to the outside can become larger than those exerted axially to the inside. During this transfer, it is possible for the pressure exerted against the outer rim flange to increase as well.

Various tests carried out with different configurations have made it possible to demonstrate the fact that this phenomenon of transfer of the forces, or, alternatively, rotation of the bottom zone, is due, on the one hand, to the increase in the pressure in the tire which creates a force acting axially towards the outside and acting against the sidewall and the bead, and, on the other hand, to the increase in the tension in the reinforcement structure following the increase in pressure in the tire.

Figure 9:
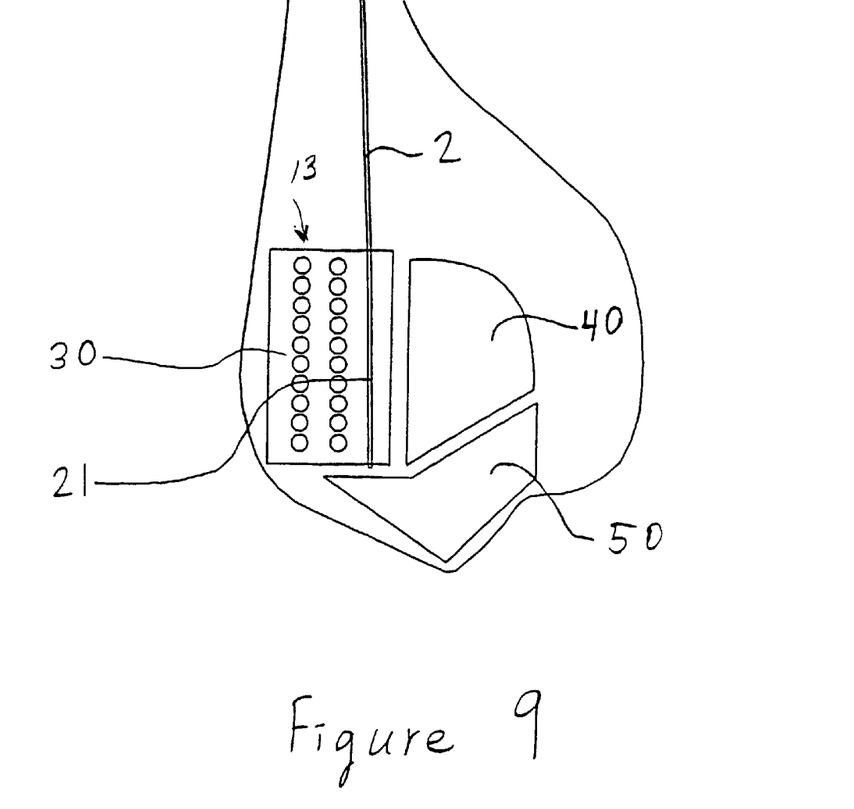
FIG. 9 shows, in an enlarged cross-section, another variant of beads, in which the different zones of the bead are arranged advantageously.

FIGS. 3 to 6, and also FIG. 9, illustrate different examples of arrangements of the zones of the bead. An anchoring zone 30, which is usually arranged axially to the inside, cooperates with the end portion 21 of the reinforcement structure 2, so as to secure the structure 2 on the bead. A rubber mix of high modulus contributes to creating this anchoring. Beneath the zone 30, or more particularly in the radially inner portion of the bead, in the zone of the seat, a bearing zone 50 is provided. The zone 50 acts as an interface between the rest of the bead and the seat of the rim. Major forces of the radial and axial type are therefore transmitted by the zone 50. A rubber mix of high modulus contributes to the transfer of these forces by ensuring good holding of the bead against the rim.

Between these first two zones 30, 50, an intermediate zone 40 is provided, so as to ensure mechanical continuity. The forces can thus be transmitted from the anchoring zone 30 towards the bearing zone 50, via the intermediate zone 40.

Figure 3:
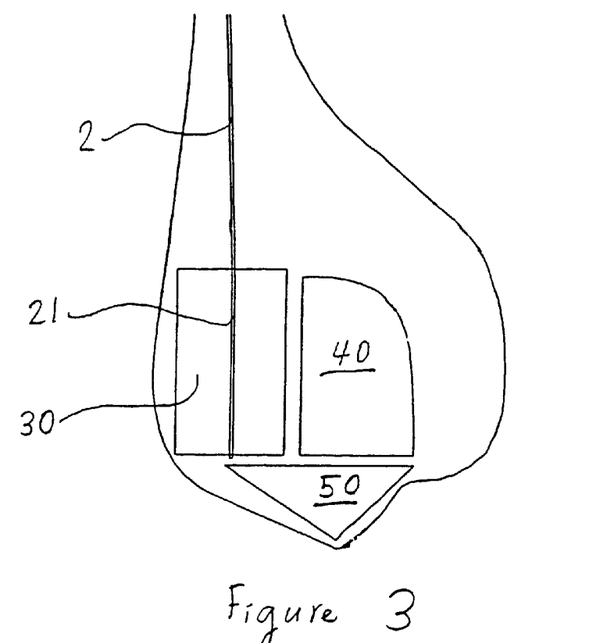
FIG. 3 shows, in an enlarged cross-section, another variant of beads, in which the different zones of the bead are arranged advantageously (the circumferential cords are not shown in this figure)

FIG. 3 shows an arrangement of the three zones such that the zones 30 and 40 are substantially radially side by side, with the zone 50 being arranged radially to the inside of the other two zones. The zone 50 is separated from the other two zones 30, 40 by a substantially axial, rectilinear inter-zone space. An inter-zone space is present between each of the three zones. According to various variants which have not been shown, the zones are joined two by two, for example the zone 30 is twinned with the zone 40, the zone 40 is twinned with the zone 50, etc. Such zones are then no longer separated as in the example of FIG. 3.

The three zones may also be joined, to form a unified assembly such as illustrated, for example, in FIG. 2.

The inter-zone spaces are advantageously occupied by a rubber mix of a modulus which is lower than that of the mixes forming the zones.

Figure 4:
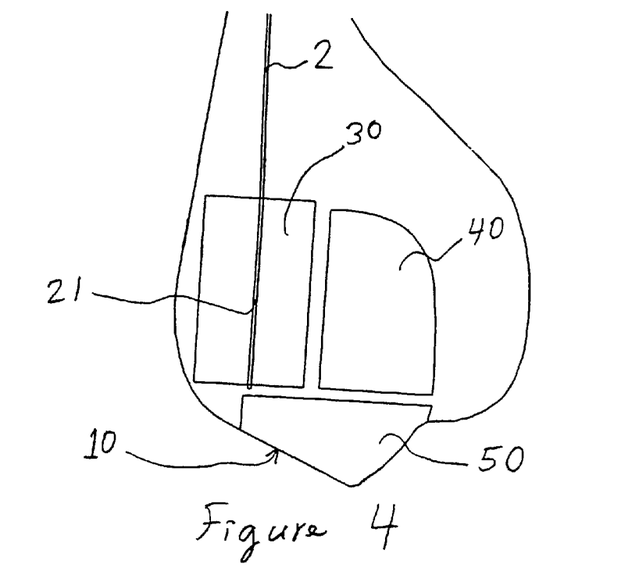
FIG. 4 shows, in an enlarged cross-section, another variant of beads, in which the different zones of the bead are arranged advantageously (the circumferential cords are not shown in this figure)

FIG. 4 shows an example similar to that of FIG. 3, except that the zone 50 extends radially internally as far as the edge of the bead or as far as the seat. For clarity of the illustration of the zones, the circumferential cords 12 of the anchoring zone 30 are not shown in FIGS. 3 and 4.

Figure 5:
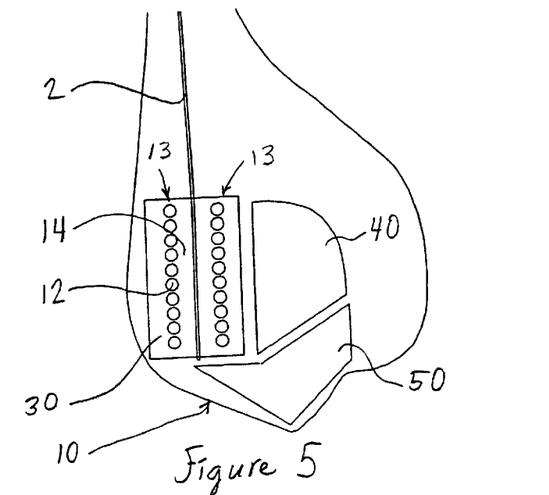
FIG. 5 shows, in an enlarged cross-section, another variant of beads, in which the different zones of the bead are arranged advantageously.

FIG. 5 shows another example similar to that of FIG. 3, with the zone 50 extending radially and axially outwards so as to form a V-shaped interface with the other two zones.

Figure 6:
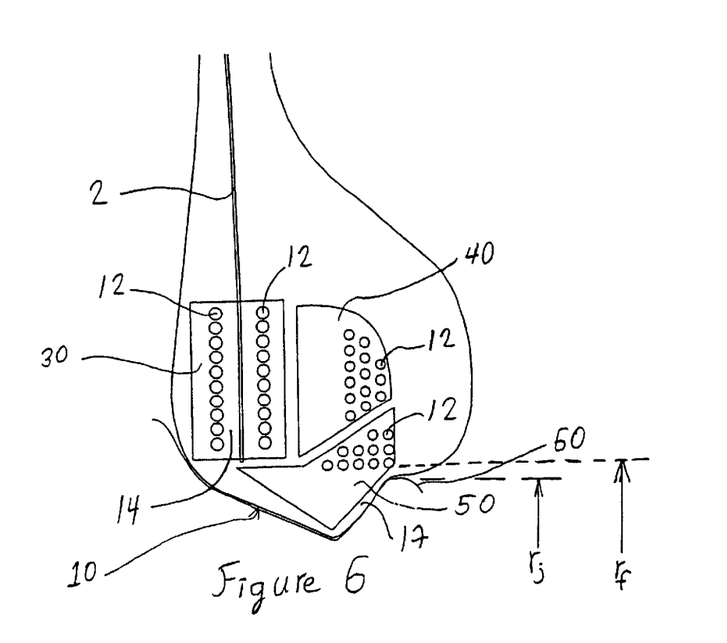
FIG. 6 shows, in an enlarged cross-section, another variant of beads, in which the different zones of the bead are arranged advantageously.

FIG. 6 shows an example similar to that of FIG. 3, also comprising alignments or stacks of cords 12 in the intermediate zone 40 and/or in the bearing zone 50. These cords serve in particular to clamp the bead on the rim. They may be cords of the metallic, hybrid or textile type.

The tire according to the invention is particularly suitable for use on a rim of the type described in EP 0 673 324 (U.S. Pat. No. 5,634,993, the disclosure of which is hereby incorporated by reference). Such a rim comprises a seat and preferably a raised area or flange located axially and radially towards the outside. The quality of the contact or of the bearing of the bead on the seat is particularly important. One of the means according to the invention used to improve such contact or bearing consists in optimizing the phenomenon previously described of rotation of the bottom zone of the bead.

This phenomenon arises from the structure of the bead used. The axial position of the reinforcement structure 2 relative to the center of thrust CP of the bead may to a certain extent influence the moment M created by a tensile force T induced in the reinforcement structure 2. This moment M acts on the rotation effect of the bottom zone of the bead. See FIG. 2.

Owing to the phenomenon of rotation of the bottom zone of the bead, the bead, in particular at the level of the seats, bears more on the corresponding bearing face of the rim, which makes it possible to increase the cohesion at the level of the rim/tire interface. This aspect is particularly important, for example when a vehicle rounds tight curves or, alternatively, corners at high speed. These characteristics therefore contribute to improving the safety of the tire/rim assembly and hence of the vehicle.

Among other things, the choice of one or the other of the variants illustrated in the various figures makes it possible to influence the phenomenon of rotation of the bottom zone of the beads.

These figures illustrate several examples of arrangement of the reinforcement structure 2 relative to the stacks 13 of cords. Thus, in FIG. 2, the stacks of cords are arranged on the same side of the reinforcement structure 2; in this example, the axially outer portion.

FIG. 5 shows a variant in which the reinforcement structure 2 is inserted between a stack 13 of cords 12 arranged axially to the inside and a stack 13 of cords 12 arranged axially to the outside relative to the structure 2.

FIG. 9 shows another variant in which the stacks 13 of cords are arranged on the same side of the reinforcement structure 2; in this example, the axially inner portion.

These examples are given merely by way of illustration: other variants with, for example, more or less stacks 13 possibly comprising different numbers of cords 12 may be used.

These different variants of embodiments provide different mechanical effects at the level of the beads, the anchoring of the reinforcement structure and, consequently, at the level of the rim/tire interface. Thus, with a variant of the type shown in FIG. 2, the lever arm between the structure 2 and the center of thrust CP is large, providing a large moment M. On the contrary, in a variant of the type shown in FIG. 9, the lever arm is rather short, which limits the value of the moment M. The latter will therefore have a lower value in the second case than in the first.

The geometry or the arrangement of the bonding rubber 14 may also influence the phenomenon of rotation of the bottom zone. FIGS. 2 and 6 illustrate this fact. Given the probable presence of a protrusion or flange on the rim, which is capable of bearing against the outer bearing zone of the bead, the rotation of the bottom zone will involve a reaction force R coming from this protrusion. To facilitate the rotation or to enable it to be greater, it is preferable to limit the reaction force R. In order to do this, a buffer zone is provided on the bead between the zone of mix of high modulus and the flange of the rim.

The buffer, or loading, zone 17 is formed of a material which is more flexible than that generally located in the interface zone between the arrangement 11 of cords and the reinforcement structure 2. As described previously, under the combined action of the pressure of the tire and a tension T acting on the structure 2, the moment M thus created acts to load the zone 17, thus promoting the rotation of the bottom zone of the bead.

The zone of loading 17 is preferably located along the outer axial profile of the bead provided to be arranged adjacent to the rim flange. For example, the zone 17 maybe located, as illustrated in FIG. 6, between the radially outer portion substantially adjacent to the radially lower point of the bead, and extended axially and radially towards the outside, so as to form the outer contour of that portion of the bead which is able to run along the rim flange.

Figure 10A:
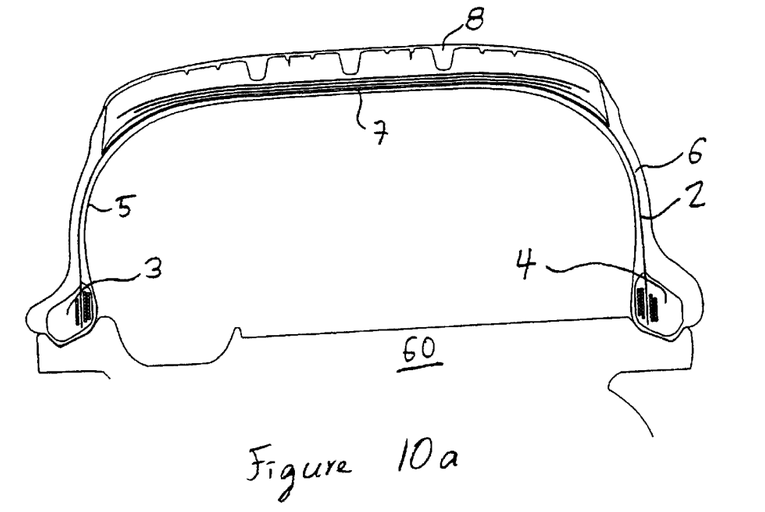
FIG. 10a shows, in cross-section, a tire according to the invention, mounted on a rim of suitable type.
Figure 10B:
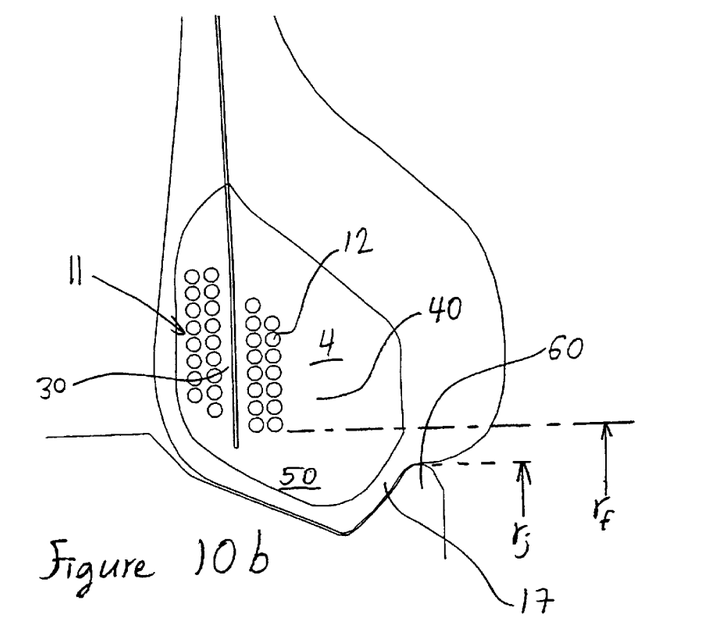
FIG. 10b shows, in an enlarged cross-section, the tire of FIG. 10a mounted on a rim of suitable type.

The bases of the stacks 13 (the cords radially closest to the axis of rotation of the tire) are preferably arranged radially farther to the outside than the end of the flange (axially and radially outermost portion of the flange), as illustrated, for example, in FIG. 6 and in FIGS. 10a and 10b. The bases of the stacks are advantageously provided so as to be arranged radially externally relative to the flange of the rim 60 which is matched to the tire. The mounting/demounting operations are then facilitated. Thus, in FIG. 6 and FIG. 10b, it will be seen that $r_f$ (radius of the first cords) is greater than $r_j$ (radius of the rim flange or hook). This radius corresponds to the distance or spacing from the axis of rotation.

The elasticity modulus of the mix used in the loading 17 zone may, for example, be between 10 and 40 MPa, but is preferably less than 20 MPa. "Elasticity modulus" of a rubber mix is understood to mean a secant modulus of extension obtained at a uniaxial deformation of extension of the order of 10% at ambient temperature.

The interface zone between the reinforcement structure 2 and the arrangement of cords 11 may be provided such that the reinforcement structure 2 is interposed between or close to the stacks 13, with the end portion 21 of the structure 2 being located in a given radial position somewhere along one of the stacks, or alternatively close to the base of a stack, but without significantly extending beyond the base of the stacks in the direction of the axis of rotation of the tire.

Otherwise, according to another aspect of the invention, the end portion 21 may be located radially closer to the axis of rotation of the tire than the base of the stacks 13, thus creating an extension 15 of the reinforcement structure 2 beyond the base of the stacks 13. FIG. 2 shows an example of such an extension 15. The extension 15 may then take a large number of arrangements, such as, for example, an alignment substantially parallel to the seat 10, an alignment substantially parallel to the axis of rotation of the tire, etc.

According to another variant, the end portion 21 forms an upturn around the stack or towards the axially outer stack or alternatively between two stacks, preferably stacks other than those via which the structure 2 enters the bead.

The length of the extension 15 may vary from a few millimeters to a few centimeters.

FIGS. 1 and 2 illustrate another aspect of the invention, according to which the stacks 13 of cords 12 are arranged asymmetrically in the two beads. This type of arrangement is particularly advantageous for a tire comprising beads which are not identical, either because of their shapes, their profiles, their dimensions, their constituent materials, their average distance from the axis of rotation of the tire, etc.

Document EP 0 673 324 (U.S. Pat. No. 5,634,993) illustrates an example of such a tire. In fact, since it is used on a rim comprising a non-symmetrical profile and the profile of the beads is matched to this profile, the bead profile is asymmetrical.

Furthermore, owing to the position of the tire on a vehicle, the two beads do not have to be subjected to the same levels of forces and stresses. Frequently, the bead on the outer side of the tire is more greatly stressed. It is therefore preferable to optimize the arrangement thereof so that it can withstand high levels of stresses. Since the axially inner bead 3 generally does not have to be subjected to such high levels of stresses, its structure can be simplified.

In the example of embodiment illustrated in FIG. 1, the first bead 3 comprises three stacks 13 of cords, while the second bead 4 comprises four. The production of the first bead therefore requires less material and fewer manufacturing steps. This type of architecture is therefore more economical.

In order to make allowance for a maximum number of physical and mechanical stresses, not only the number of stacks of cords, but also the number of cords per stack, the arrangement of the types of rubbers between them, the shape of the bead, the number of zones (anchoring, intermediate, bearing), their forms, their dimensions, the nature or the material of the cords, etc., may vary from one bead to the other.

Not only is it possible, therefore, to contribute to reducing the costs of the finished product, but it is also possible to optimize the structures of each of the beads 3 and 4 according to their respective specific features, which is not possible on a symmetrical profile. In this latter case, the single arrangement applied to both beads is for most of the time a compromise taking into consideration, as far as possible, the sometimes contradictory properties desired for each of the beads.

The different examples of embodiment described and/or illustrated may advantageously be produced using devices of the types described in EP 0 580 055 (U.S. Pat. No. 5,616, 209).

Thus, for example, it is very advantageous to build the tire on a central core which imposes the shape of its internal cavity. There are applied to this core, preferably in the order required by the final architecture, all the constituents of the tire, which are arranged directly in their final position, in a substantially final profile. In this case, such a tire can be moulded and vulcanised as set forth in U.S. Pat. No. 4,895,692.

What is claimed is:

1. A tire for a vehicle wheel, comprising:

two sidewalls spaced apart axially from each other and joined at their radially outer portions by a crown zone provided on its radially outer portion with a circumferential tread;

a bead, arranged radially to the inside of each of the sidewalls, each bead comprising a seat and an outer flange which are intended to come into contact with a suitable rim;

a reinforcement structure extending substantially radially from each of the beads, along the sidewalls, towards the crown zone;

at least one of said beads comprising:

(1) a bead seat comprising a generatrix, the axially inner end of which lies on a circle of a diameter greater than the diameter of the circle on which the axially outer end is located;

(2) an anchoring zone for the reinforcement structure in said bead, comprising a substantially radial arrangement of circumferential cords arranged in the vicinity of a portion of said reinforcement structure and comprising at least two cords distributed on each side of said reinforcement structure, and an anchoring rubber mix being disposed between said circumferential cords and said reinforcement structure;

(3) an intermediate zone, arranged substantially axially externally to the anchoring zone and comprising at least one portion substantially radially aligned with said anchoring zone; and (4) a bearing zone for said bead which is able to lie directly or indirectly against the suitable rim seat, and comprising at least one portion axially aligned with said intermediate zone and placed radially internally with respect to said intermediate zone.

2. The tire of claim 1, in which said intermediate zone cooperates, on the one hand, with said anchoring zone and, on the other hand, with said bearing zone, so as to provide a mechanical connection between said anchoring zone and said bearing zone.

3. The tire of claim 1, in which said intermediate zone permits the transfer of forces from the anchoring zone to the bearing zone of the bead.

4. The tire of claim 3, in which the transfer of forces takes place by a moment of force.

5. The tire of claim 1, in which said bearing zone is substantially elongated.

6. The tire of claim 1, in which said bearing zone is substantially adjacent to the rim seat.

7. The tire of claim 1, in which said bearing zone is substantially formed of a rubber mix of high modulus.

8. The tire of claim 1, in which said intermediate zone is substantially formed of a rubber mix of high modulus.

9. The tire of claim 8, in which the elasticity modulus of said rubber mix of high modulus is greater than 20 MPa.

10. The tire of claim 8, in which the elasticity modulus of said rubber mix of high modulus is greater than 40 MPa.

11. The tire of claim 1, in which said bead also comprises a loadable buffer zone which is arranged in the radially inner and axially outer portion thereof, said buffer zone being capable of bearing against a flange of the rim.

12. The tire of claim 1, in which the bead portions generally around said anchoring, intermediate and bearing zones are generally occupied by a material of an elasticity modulus lower than that of the material of said anchoring, intermediate and bearing zones.

13. The tire of claim 1, in which the axially outer limit of said zones corresponds substantially to the outer limit of the rim on which the tire is intended to be mounted.

14. The tire of claim 1, in which the intermediate zone comprises a substantially radial arrangement of circumferential cords.

* * * * *

UNITED STATES PATENT AND TRADEMARK OFFICE
CERTIFICATE OF CORRECTION

PATENT NO.    : 6,659,149 B2
DATED         : December 9, 2003
INVENTOR(S)   : Pereira et al.

It is certified that error appears in the above-identified patent and that said Letters Patent is hereby corrected as shown below:

<u>Title page,</u>
Item [75], "Clemont-Ferrand" (both occurrences) should read -- Clermont-Ferrand --

Signed and Sealed this

Fifteenth Day of June, 2004

JON W. DUDAS
*Acting Director of the United States Patent and Trademark Office*